United States Patent [19]
Barb

[11] 3,751,575
[45] Aug. 7, 1973

[54] GROUND LEVEL TERMINAL HOUSING
[75] Inventor: Earl C. Barb, Muncie, Ind.
[73] Assignee: General Cable Corporation, New York, N.Y.
[22] Filed: Feb. 24, 1972
[21] Appl. No.: 228,893

[52] U.S. Cl. ............ 174/52 R, 174/38, 174/60, 248/68 R, 248/223
[51] Int. Cl. ............................................ H02g 9/00
[58] Field of Search .............. 174/37, 38, 48, 51, 174/52 R, 60; 248/68 R, 73, 223, 224, 225; 317/117, 120

[56] References Cited
UNITED STATES PATENTS

| | | | |
|---|---|---|---|
| 2,163,954 | 6/1939 | Lucas | 174/149 R X |
| 2,420,478 | 5/1947 | Hasselhorn et al. | 174/37 X |
| 2,533,779 | 12/1950 | Emde | 174/35 TS |
| 2,673,334 | 3/1954 | Julian et al. | 248/225 UX |
| 2,898,076 | 8/1959 | Versen | 248/343 |
| 2,968,689 | 1/1961 | Johnson | 174/48 |
| 3,001,103 | 9/1961 | Fitzpatrick | 174/60 X |
| 3,173,987 | 3/1965 | Potruch | 174/60 X |
| 3,565,385 | 2/1971 | Zurawski | 248/68 R X |
| 3,617,608 | 11/1971 | Wisniewski | 174/37 |

FOREIGN PATENTS OR APPLICATIONS

| | | | |
|---|---|---|---|
| 136,568 | 2/1934 | Austria | 174/60 |
| 4,998 | 9/1955 | Germany | 248/68 R |
| 736,813 | 9/1955 | Great Britain | 174/37 |

Primary Examiner—Laramie E. Askin
Attorney—Thomas P. Jenkins et al.

[57] ABSTRACT

A telephone cable terminal housing adapted to lie flat on the level ground, without excavation. A ground plate has a wide flat ground engaging border and a raised central mounting platform joined by an upstanding wall forming an outward-facing peripheral shoulder. A bell jar cover fits over the platform with its continuous side wall close about and overlapping the peripheral shoulder to enclose equipment mounted on the platform. The platform has a cable entrance opening and forms a mounting base for cable terminal apparatus. This includes terminal strips each having a support bar and resiliently bendable integral legs with T-heads that snap into T-slots in the platform or into similar T-slots in the ends of previously mounted terminal strips. For cable-to-cable splicing, corresponding bundles of wires from the cables are brought together across the terminal strips in one or more tiers and the corresponding wires spliced together. Other wires connect selected cable wires to terminal blocks for service connection, to loading coils, etc. The terminal housing provides all the advantages of an above-ground terminal housing with improved access and as good or better production of the equipment therein, it avoids the difficulties and hazards of underground housings while its ground-level mounting and low silhouette minimizes its visual and physical obstruction of the ground area on which it is mounted.

7 Claims, 9 Drawing Figures

PATENTED AUG 7 1973 3,751,575
SHEET 2 OF 2
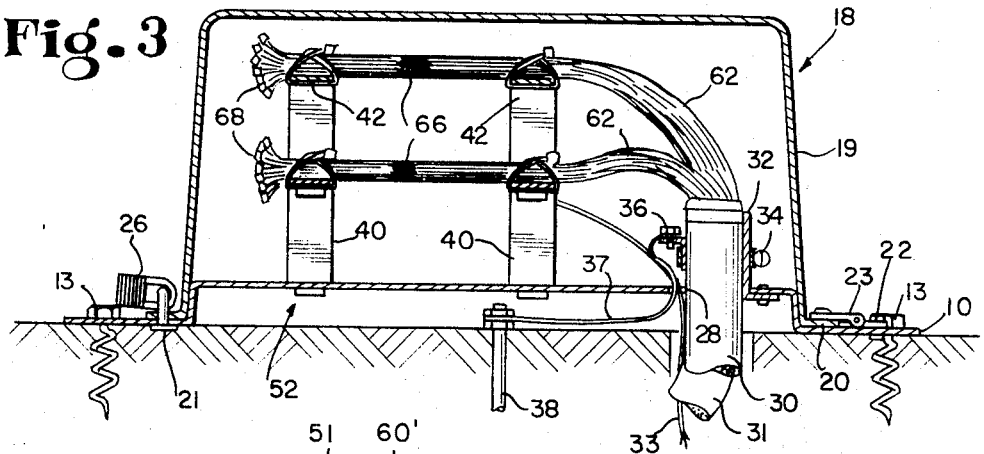
Fig.3
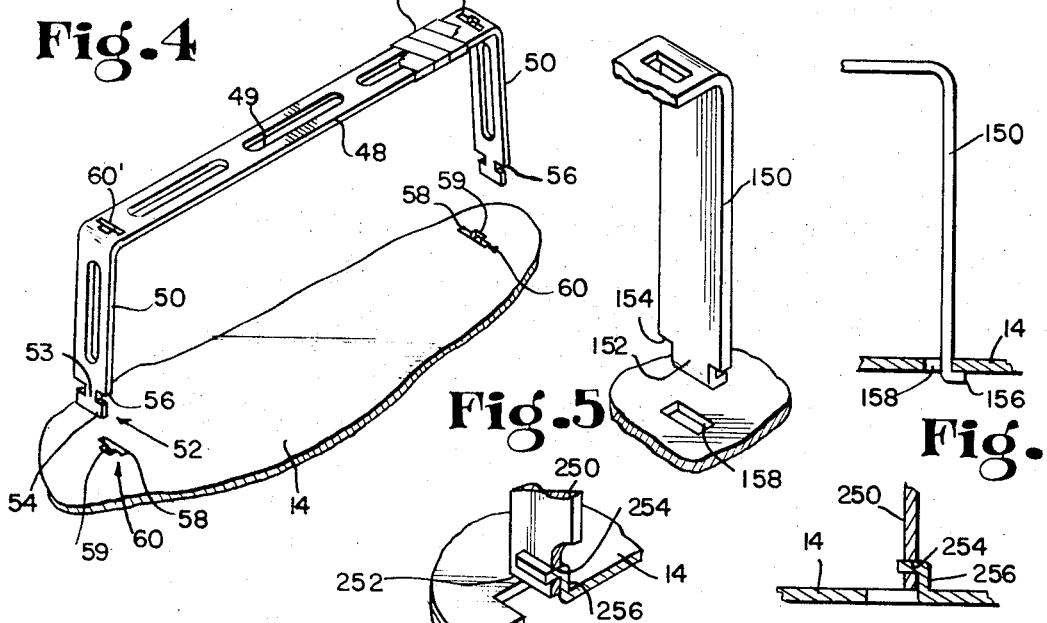
Fig.4 Fig.5 Fig.6
Fig.7 Fig.8
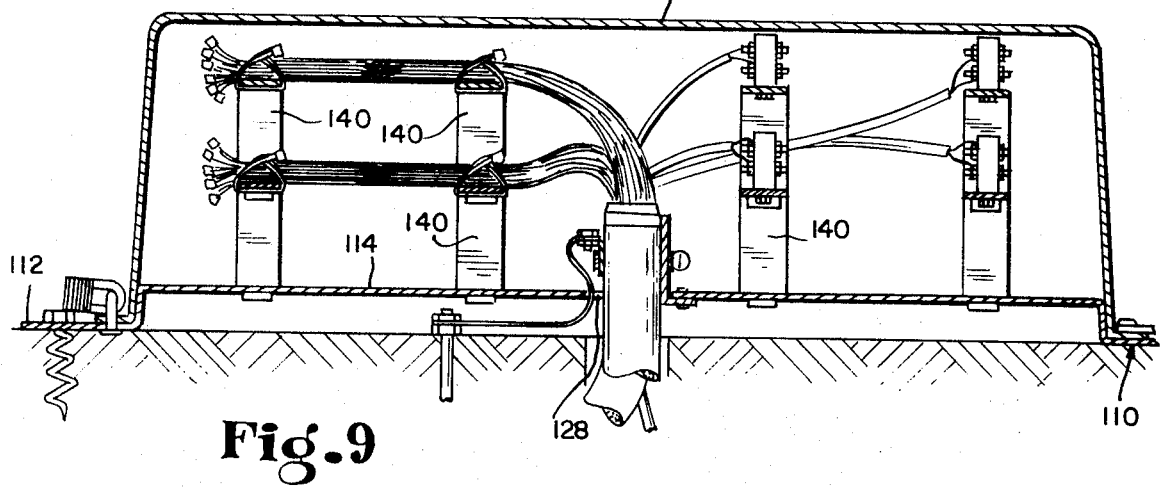
Fig.9

GROUND LEVEL TERMINAL HOUSING

BACKGROUND OF THE INVENTION

This invention relates to a terminal housing especially adapted for use in connection with underground telephone cable installations, to provide for cable-to-cable splicing and for connections with service lines to subscribers' telephones. The housing may also be useful in utility power supply installations and CATV cable installations, as for making connections between buried cables and service leads.

In underground telephone cables installations, it is necessary to bring the cable into a terminal housing at spaced positions for making cable-to-cable splices and to connect the cable wires with service lines to subscribers' telephones. The housings commonly used for this purpose are pedestal type housings in which an upstanding enclosure is mounted on a short post or pedestal extending into the ground or held in place by a stake. See for example my prior U.S. Pat. No. 3,445,581 of May 20, 1969, and Baumgartner U.S. Pat. No. 3,480,721 of Nov. 25, 1969. Such pedestals stand several feet above ground, and it is frequently necessary to place them in locations where they form unsightly intrusions in what would otherwise be uninterrupted lawn or yard area and where they present objectionable physical obstacles.

In utility cable installations there are fewer wires to handle and much less frequent access to terminal housings is necessary, so that the terminal housings may be of shorter height and smaller size, as suggested by Gunthel U.S. Pat. No. 3,162,718 of Dec. 22, 1964. However, the pedestals are still unsightly and objectionable. For utility installations, it has also been proposed to use buried terminal housings, as in Hamilton U.S. Pat. No. 3,364,299 of Jan. 16, 1968, but this presents problems of protecting the cable and its connections from moisture and ground water, as Hamilton shows. Wisniewski U.S. Pat. No. 3,482,030 proposed to mount an underground electrical conductor housing flush with the ground, but this also presents problems of protection from moisture and ground water, and is impractical for telephone cable use because it provides only limited access to a space in which it is difficult to work.

The present invention provides an above-ground terminal housing which mounts flat on the ground without excavation, provides easy and substantially unrestricted access to the work space, and gives protection from moisture and ground water equal to or better than that of many pedestal installations. The housing is of such low silhouette and unobtrusive appearance as to greatly reduce if not eliminate objection to its installation in yard and garden areas.

In accordance with the invention, the terminal housing comprises a base plate which mounts flat on a level area of the ground without excavation, and a removable bell-jar cover which stands only a short distance, e.g. 8 to 12 inches, above ground level. The center of the base plate, within the cover, forms a platform for mounting terminal apparatus, and the work space thus provided is exposed for service and work access from all sides and from above when the cover is removed. Preferably, the ground plate has a flat border portion adapted to lie on the ground, and its center portion is raised to form the mounting platform at a short distance, e.g., one inch, above the level of the border portion. Outward facing shoulder means is provided at the edges of the platform to hold the cover against displacement, and such means is preferably in the form of a continuous upstanding wall joining the raised platform to the wide border. The bell-jar cover fits over the platform with its continuous peripheral side wall overlapping the shoulder to locate the cover solidly in place over the platform and with its bell-jar edges below the level of the raised platform. The joint between the bell-jar edges and the ground plate need not be, and preferably is not, sealed, so that any condensate which runs down the walls may escape.

The raised platform provides clearance from the underlying ground, which permits mounting elements to project through the platform. The platform has a cable-entrance opening through which a loop of cable or the ends of two or more cables are brought into the work space above the platform. Terminal apparatus of any desired character may be mounted on the platform. Preferably, such apparatus includes terminal strips which yieldingly snap into locked relation with receptacles on the platform and which stand above the platform to support cable wires, terminal blocks, and the like in the work space. The terminal strips are desirably in the form of an inverted U-shaped bracket which has mounting elements at the ends of its legs which releasably engage the receptacles on or in the platform upon resilient bending movement of the legs in opposite directions, and the strips are sufficiently resilient to effect such engagement and to permit ready manual mounting and removal. The terminal strips desirably have similar receptacles at their ends, to permit a second tier or additional tiers of terminal strips to be stacked on top of a previously mounted tier of such strips.

In a preferred form, the terminal strips comprise a wire-supporting bar with end legs provided with T-heads which take into T-slots punched in the platform and resiliently spring into locking position. Similar T-slots are formed at the ends of the bar of the terminal strip to permit the terminal strips to be stacked one on the other.

BRIEF DESCRIPTION OF THE DRAWINGS

The accompanying drawings illustrate the invention. In such drawings:

FIG. 3 is a longitudinal sectional view taken substantially on the lines 3—3 of FIG. 1;

FIG. 4 is an isometric view of a preferred form of terminal strip and its mounting receptacles;

FIGS. 5 and 6 are isometric and sectional views of an alternative form of mounting for the terminal strips;

FIGS. 7 and 8 are isometric and sectional views of a further alternative form of terminal strip mounting; and FIG. 9 is a side elevational view of a terminal housing embodying the invention in a larger size and of different shape.

DESCRIPTION OF THE PREFERRED EMBODIMENT

Figure 1:
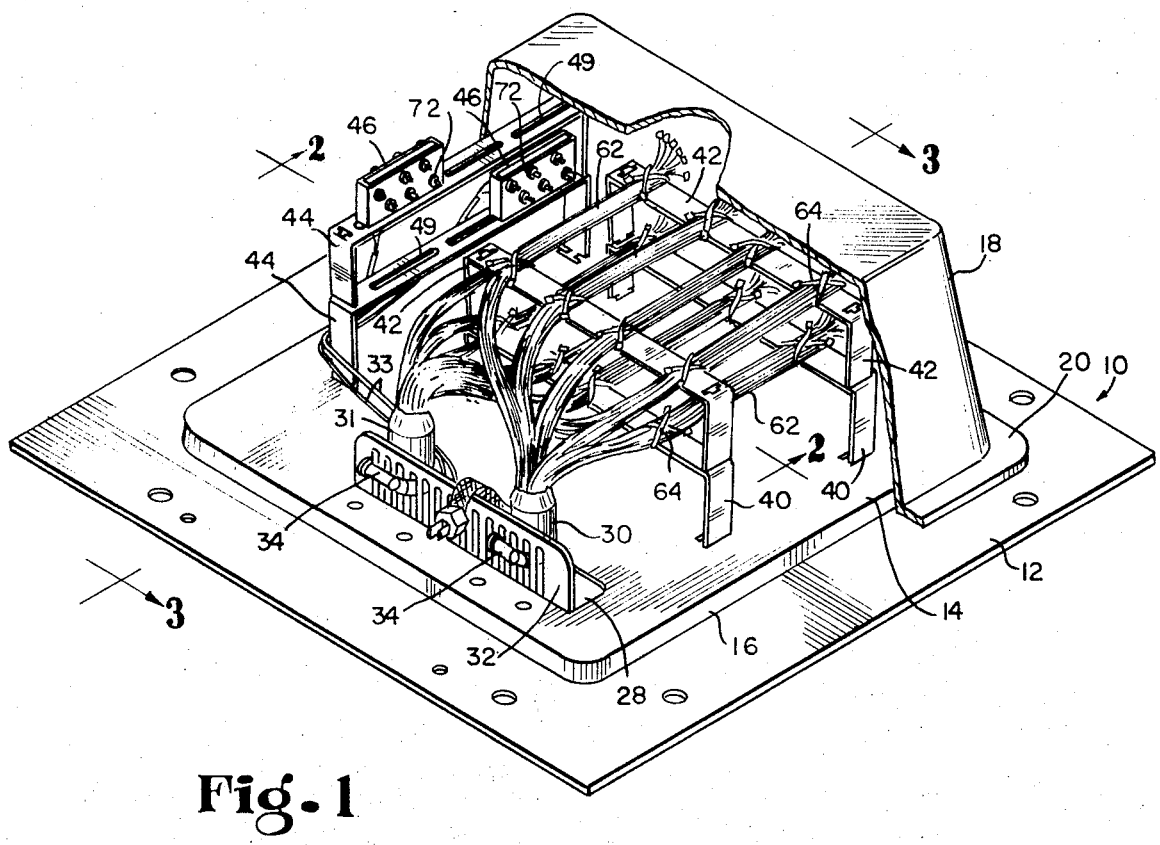
FIG. 1 is an isometric view of a preferred embodiment of the invention shown in use to make a cable-to-cable splice of multiple-wire cable and to enclose terminal blocks for making service connections to subscribers' telephones.

The terminal housing shown in FIGS. 1–4 comprises a square base plate 10 having a wide border portion 12 adapted to lie flat on the level ground. Ground anchors or screws 13 may be used to secure it to the ground. Within the border 12, the center portion of the base plate is pressed or formed upward to form a mounting platform 14, joined to the border 12 by side walls 16 which form outwardly-facing shoulders. A deep pan-like bell-jar cover 18 having side walls 19 and a continuous peripheral flange 20 at its lower edge fits down over the mounting platform close against the side walls 16 so that the shoulders formed by those side walls firmly locate the cover against lateral displacement. The cover 18 is releasably secured in place. As shown, a pair of separable hinges have fixed parts 22 fastened to the base plate 10 and separable parts 23 fixed to the flange 20 of the cover 18. The hinge pin is fixed to one of such parts and is slidably removable from the other, and the two hinges are so arranged that when the cover is lifted, it may be moved laterally to separate the hinge connections. The opposite side of the cover may be held down by a lock shown as a keeper 21 which passes through the rim 20 of the cover and which receives a padlock 26.

With a cover about 8 inches deep, I consider it sufficient to elevate the mounting platform 14 about an inch above the border 12. This provides clearance from the underlying ground, and disposes the platform at a level above that to which water would normally rise inside even if the housing was covered by water up to its top. The platform is not sealed from the ground, and the joint between the side walls 16 of the base plate and the side walls 19 of the cover need not be, and desirably are not sealed. This permits any condensate forming on the inside of the cover and running down the side walls to escape through that joint.

As shown in FIGS. 1 and 3, the mounting platform 14 is provided adjacent one end with a cable entrance opening 28 through which underground cables 30 and 31 and service cables 33 can be brought to the work space above the platform 14. To fix the ends of the cables in place, a bracket 32 is fixed to the outer edge of the entrance opening 28, to which the cables are clamped by clamps 34. These also secure to the cable a grounding connector 36 which is connected by a grounding wire 37 to a grounding stake 38 or, if the base plate is of metal, to a grounding terminal on that base plate.

As shown, the platform 14 carries a lower tier of two terminal strips 40 mounted directly on the platform, and a second tier of two terminal strips 42 stacked on top of the strips 40. It also carries two stacked terminal strips 44 which serve as mounting platforms for terminal connectors 46.

The terminal strips 40, 42 and 44 are all identical and as shown in FIG. 4. Each consists of a generally U-shaped bracket having an upper support bar 48 and end legs 50 bent at an angle of less than 90° from the plane of the bar 48. Conveniently, the bar 48 is slotted with three central slots 49 to facilitate mounting such things as the terminal blocks 46, and the legs 50 may also be centrally slotted for convenience in mounting other equipment. The lower end of each leg 50 is formed with a T-head 52 having a stem 53 and a cross bar 54. The cross bar is shorter than the width of the leg, which leaves the lower end of the leg with downward facing shoulders 56 which project outward beyond the cross bar 54. The platform 14 is slotted at spaced points with pairs of short T-slots 60 having a wide portion 58 adapted to pass the cross bar 54 of the T-head 52 and a narrower side slot 59 adapted to receive the stem 53 of the T-head. The T-head 52 is insertable through the slot 60 to bring the shoulders 56 against the top surface of the platform 14, and the leg is then movable outward to carry the stem 53 of the T-head into the side slot 59 and to carry the cross bar 54 beneath the platform at the edges of that side slot 59. The slots 60 are spaced a distance equal to the length of the bar 48, whereas the legs 50 are bent less than 90° from the plane of that bar so that they must be resiliently bent inward to insert their T-heads 52 in the slots 60. The strip is made sufficiently resilient to permit such bending, and to cause the legs to spring outward to carry the T-heads 52 into the side slots 59 and thereby lock the terminal strip 40 in fixed position on the platform 14. In use, the strips are desirably wrapped with insulating tape 51.

The ends of the bar 48 are provided with slots 60' similar to the slots 60 for the reception of the T-heads 52 of the upper tier of terminal strips 42 stacked on top of the lower strips 40. Such upper tier strips are mounted in such holes 60' in the same way the strips 40 are mounted in the receptacle holes 60. The terminal strips 44 may be assembled with their terminal blocks 46 and then mounted in holes 60 in the platform and on each other in like manner.

Use and operation of the terminal housing for splicing cables 30 and 31 and for connecting the spliced cable to one or more service cables 33 or other line equipment is as follows: The ends of the buried cables 30 and 31 are brought up through the surface of the ground at the point where the terminal housing is to be mounted. The ground stake 38 is driven into the ground, and a ground wire connected to it. The service cables 33 are laid and their ends brought up through the ground adjacent the cable ends. The ends of the cables and wires are then passed through the entrance opening 28 of a base plate 10 and such base plate is laid on the ground which has been suitably leveled. The base plate is then secured in place with the ground anchors 13 driven or screwed into the ground through openings in the border flange 12 of the base plate. The ends of the cables 30 and 31 are stripped of their jackets and shields and are desirably taped, and the ends are then clamped to the bracket 32 by clamps 34 which also carry grounding fixtures 36. The grounding fixture 36 is connected to the ground wire 37.

Commonly, cables consist of bundles of wires separated into differently identified groups, and in the case shown the cables contain eight such groups. In preparation for splicing, two terminal strips 40 are mounted in slots 60 in spaced relation on the platform 14. Four corresponding groups of wires are separated out from the two cables and laid together in bundles 62 across the terminal strips, and the four combined groups are tied together and to the bars 48 of the terminal strips 40 by straps 64. Between the two terminal strips 40, separate groups of wires may desirably be twisted together as indicated by the twisting 66 shown in FIG. 3. Beyond the terminal strips, the ends of the wires are cut off even, the individual wires from the two cables are paired, and the pairs are spliced either by intertwisting or by attaching conventional wire connectors 68. This gives a lower tier of four bundles 62 of wires each containing the corresponding wires from the two cables 30 and 31, neatly and firmly trained across the two terminal strips 40 and with spliced connections between the corresponding wires in orderly and accessible location.

When the lower tier of connections is completed, two additional terminal strips 42 are mounted in stacked relation on top of the terminal strips 40 by engaging their T-heads 52 in the slots 60' of the lower tier of terminal strips 40. The remaining four sub-groups of wires from the two cables 30 and 31 are then brought together into bundles 62, laid across the bars of the terminal strips 42, twisted together at 66, strapped in place with straps 64, and spliced together with wire connectors 68, in the same manner as the lower tier. This completes splicing the two cables one to the other.

For making service connections, a terminal block 46 is mounted on a terminal strip 44, and such terminal strip is mounted in slots 60 on the platform 14. As shown, the terminal strips 44 extend transversely across the ends of the terminal strips 40–42 supporting the spliced wires. For each wire of the service connection, a third wire is connected into the spliced wires of the appropriate cable circuit and connected to a terminal post 72 on the terminal block 46. The wires of the service cable 33 are then connected to the same binding posts 72, and this connects the service cable 33 to the appropriate circuits of the cables 30 and 31.

When the connections are completed, the bell-jar cover 18 is installed. For this purpose, its hinge parts 23 are connected to the fixed hinge parts 22, with the cover partly open, and the cover is then lowered to closed position and secured in place with the padlock 26 or other fastening device.

The base plate 10 and the cover 18 are desirably of heavy drawn sheet metal, or of strong reinforced plastic, so that they will readily withstand any reasonable amount of abuse to which they may be subjected. The base plate may be firmly anchored to the ground, and its wide border permits a lawn mower to be run close enough to the housing to cut grass at the edges of the base plate and avoids need for hand trimming. The cover 18 is firmly supported against dislodgement, by engagement of the lower edges of its walls with the shoulders formed by the upstanding walls 16 of the base plate. The bell-jar action of the cover serves to exclude water from entry to the work space, either from the ground or up through the joint between the cover and the base plate. Even though the terminal housing becomes completely covered with water, the bell-jar effect prevents entry of water to a level high enough to wet the terminal equipment on the mounting platform 14. The assembly is resistant to the entry of mice and vermin. The low and unobtrusive silhouette of the terminal housing makes it much more acceptable and less objectionable as an installation in a lawn or garden area, and its low height permits it to be readily hidden by or blended in with plantings, or to be used as a base for a decorative statue, bird bath, or other garden piece or ornament.

The parts of the terminal box are all adapted to be easily assembled at the installation site so that they can be transported in knocked down condition. The cover is desirably formed with sufficient taper to permit it to be stacked with others of the same kind, and this permits the housings to be shipped and transported in much more compact form than prior pedestal housings.

A modified terminal strip mounting is shown in FIGS. 5 and 6. Each end leg 150 of a terminal strip is cut to form a central tongue 152 between downward facing shoulders 154, and the lower end of the tongue 152 is bent at right angles to form a hook 156. The hooks of the two legs are bent in opposite directions. The mounting platform 14 is provided with spaced rectangular openings 158 of a size sufficient to pass the tongues 152 and their hooks 156. When the tongues are fully inserted through the openings 158 to carry the shoulders 154 against the face of the platform 14, the legs are moved in the direction of the hooks to carry the hooks 156 under the material at the edges of the holes 158, which locks the legs in the holes. The legs are desirably so formed, and the receptacle holes 158 for receiving the tongues 152 are so spaced that when the tongues of the two legs are entered through the holes 158 the legs will be oppositely biased for movement in the directions of the hooks 156, to press those hooks to locking position as shown in FIG. 6.

A further modified form of terminal strip mounting is shown in FIGS. 7 and 8. The two legs 250 of the terminal strip are cut off square to form flat end faces 252, and the legs are punched with transverse openings 254 adjacent those ends. To mount such legs, the platform 14 is provided with two angularly bent tongues 256 struck up from the material of the platform and having their free ends extending horizontally in position to enter the punched holes 254 of the legs when those legs are placed with their end faces 252 in abutting relation with the face of the platform 14. Again, relationship is such that when the legs 250 are engaged with the tongues 256, the legs will be biased in opposite directions to cause the ends of the legs to engage themselves on the tongues 256. In this case, as in others, the biasing acts in opposite directions at the two ends of the terminal strip and may be either outward in opposite directions as contemplated in FIG. 4, or inward if the parts are arranged for inward engagement of the locking mechanism.

Figure 2:
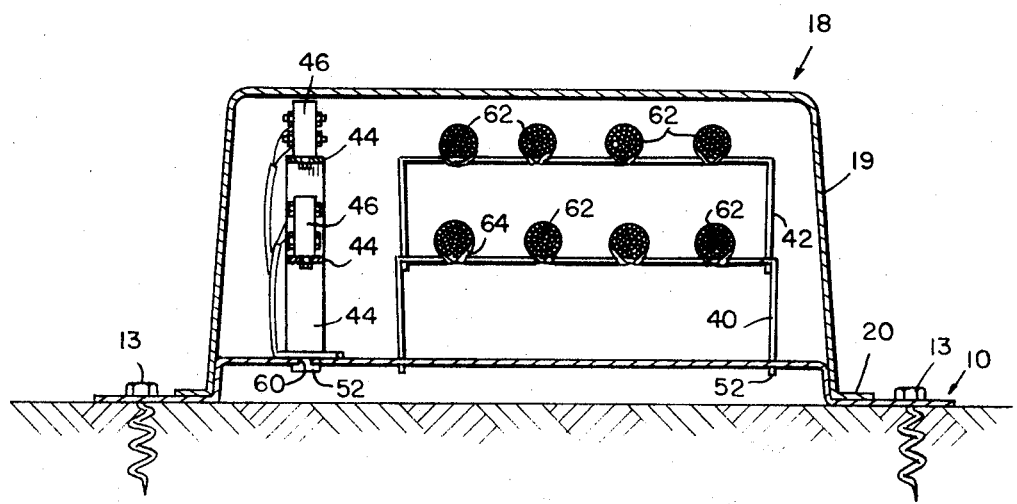
FIG. 2 is a transverse sectional view taken substantially on the line 2—2 of FIG. 1.

A square configuration of the terminal housing as shown in FIGS. 1–3 is convenient and desirable for many applications, but the invention is not limited to this configuration, and terminal housings embodying the invention may be of various different shapes and sizes. FIG. 9 shows such a modification. The terminal housing there shown comprises a base plate 110 of rectangular shape approximately twice as long as wide. Like that of FIG. 1, it has a wide border flange 112 adapted to lie flat on the level ground, and its center portion is raised to form a platform 114. In this case, the cable entrance opening 128 is at the center of the platform. One end portion of the platform supports two tiers of terminal strips 140 for a cable-to-cable splice as in FIG. 1. The opposite end of the platform supports other terminal apparatus, such as line relays, loading coils, terminal blocks, and the like in communications installations, and meters, fuses, circuit interrupters, and the like in power distribution installations. The platform is covered with a bell-jar cover 118 shaped to fit down over and around the raised platform 114, and the cover is secured in place in a manner similar to that in FIG. 1. By such modifications as shown in FIG. 9, terminal housings in accordance with the present invention can provide work space equivalent in size and shape to that provided by any of the prior pedestal type terminal housings, and can provide it with equal or better access, with equal or better protection from the elements, and in a form much more acceptable for mounting in yard or garden areas.

I claim:
1. A ground-level terminal housing adapted for use with buried conductor cables, comprising,
 a ground plate having a wide, flat border portion about its entire periphery, forming a ground engaging portion of large area to lie flat on level ground and thereby provide substantially full support for the housing thereon, without excavation or foundation means,
 having a central mounting platform for cable terminal apparatus, raised a short distance above said border portion to clear the underlying level ground and connected to said border portion by an upstanding wall forming an outward-facing peripheral shoulder to provide locating means for locating a cover thereover,
 a bell-jar cover fitting over the platform and engaging said shoulder in overlapping relation to locate the cover on the ground plate, said cover being of low height, substantially less than at least one of its horizontal dimensions, so as to stand only a short height above ground level, and defining a work space of broad low height above said platform which is openly exposed for service access when the cover is removed,
 said platform containing a cable-entrance opening for passing a portion of a buried cable upward therethrough to the work space over the platform,
 and cable terminal apparatus mounted on said platform within the cover for providing horizontal cable distribution support means and terminal connections in a plane at at least one level elevated substantially above the platform and the lower edge of the cover.

2. A terminal housing as in claim 1 in which said cable terminal apparatus comprises one or more resilient terminal strips each having a wire-supporting horzontal bar and legs integrally joined thereto, said platform having spaced openings therein, and said legs having mounting means interengaged with said platform at said spaced openings, said mounting means being held in such engagement by resilient stress in said terminal strip and being releasable therefrom by resilient bending of the legs from mounted position.

3. A terminal housing as in claim 2 in which the platform is elevated above the level of the border portion and the mounting means on the legs of said terminal strips are T-heads at the ends of the legs, and said spaced openings in said platform are T-slots having a first portion through which the T-heads may be inserted and a side portion into which the heads may move to lock the legs in mounted position, the legs being resiliently biased toward said locked position.

4. A terminal housing as in claim 2, which includes at least one terminal strip mounted on the platform to form a lower tier support, and a second terminal strip mounted in like manner on the first in stacked relation thereon to form an upper tier support.

5. A terminal housing as in claim 1, in which the platform has spaced openings therein, in combination with at least one resilient terminal strip including legs having end shoulders engaging the face of said platform adjacent said spaced openings and having retaining means extending through said spaced openings and upon movement of the legs in opposite directions engaging beneath the platform and thereby retaining the shoulders against the face thereof, the legs being resiliently biased to such opposite movement.

6. A terminal housing as in claim 1 in combination with at least one resilient terminal strip having a wire-supporting bar and integral mounting legs, said platform having spaced receptacles for mounting said legs and releasably engaged by the legs upon opposite movement of the legs from an initial mounting position, the legs being manually movable to said initial mounting position and resiliently biased to such opposite movement when in said initial mounting position.

7. A terminal housing as in claim 6, which includes at least one terminal strip mounted on the platform to form a lower tier support, and a second terminal strip mounted in like manner on the first in stacked relation thereon to form an upper tier support.

* * * * *